W. LUMLEY.
BRACKET AND FIXTURE.
APPLICATION FILED AUG. 25, 1913.
1,160,736.
Patented Nov. 16, 1915.
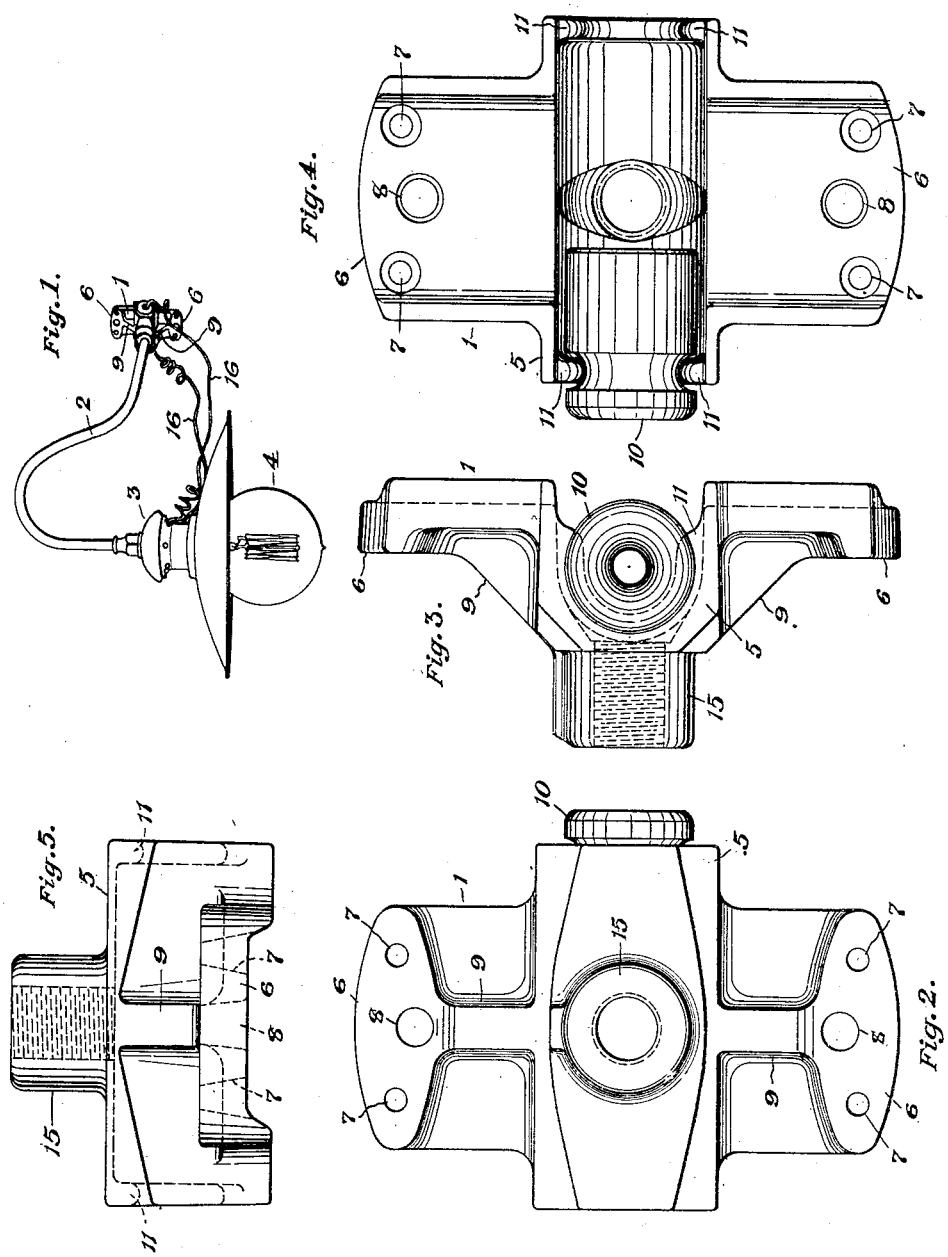
WITNESSES:
INVENTOR:
Wilfrid Lumley,
by
ATTORNEY.

UNITED STATES PATENT OFFICE.

WILFRID LUMLEY, OF CONNEAUT, OHIO, ASSIGNOR TO GENERAL ELECTRIC COMPANY, A CORPORATION OF NEW YORK.

BRACKET AND FIXTURE.

1,160,736.      Specification of Letters Patent.      Patented Nov. 16, 1915.

Application filed August 25, 1913. Serial No. 786,486.

*To all whom it may concern:*

Be it known that I, WILFRID LUMLEY, a citizen of the United States, residing at Conneaut, in the county of Ashtabula, State of Ohio, have invented certain new and useful Improvements in Brackets and Fixtures, of which the following is a specification.

My invention relates to bracket fixtures and brackets, and it presents various novel features which will be apparent from the following description of one form of device embodying it. While, however, my invention extends to many of the specific features and details of this device, it is not confined thereto, but can be carried out and applied in various ways.

In the accompanying drawing, Figure 1 is a perspective view of one form of device embodying my invention as applied to the mounting and support of an incandescent lamp. Fig. 2 is a front elevation of the bracket proper; Fig. 3 is a side elevation of the bracket; Fig. 4 is a rear elevation; and Fig. 5 is an end view, one of the parts shown in the other figures being omitted.

The fixture shown in Fig. 1 comprises a bracket 1 adapted to be secured to a wall or to a post, or to any other suitable object, and an arm 2 projecting from the bracket and carrying a socket fixture 3 with a lamp 4. As will be seen from Fig. 2, the bracket proper 1 comprises a main portion 5 with portions 6 extending laterally therefrom which are in effect lugs or feet for the attachment of the bracket 1. These lug or foot portions 6 are strengthened by web portions 9 extending laterally from the main portion 5, and their outer ends 6 are somewhat thickened and have holes 7 and 8 adapted to receive screws, bolts, nails or the like for securing the bracket. The sides of the feet 6 which lie against the object to which the bracket is attached are so formed as to give a good bearing against either a flat surface or a curved one,—such as that of a telegraph pole, for instance. As shown in Figs. 3, 4 and 5, these sides of the feet have depressions therein which are in effect shallow grooves extending transversely with respect to the main portion 5 and formed by projecting rim or flange like portions at the edges of the feet. It will be observed that the two central screw holes 8 in the feet are somewhat larger than the four holes 7 so as to take the larger screws or the like that will naturally be employed if only two screws are used for securing the bracket instead of four.

As will be seen from Figs. 3, 4 and 5, the main portion 5 of the bracket carries insulating means 10. In the structure shown, this portion 5 is so formed as to substantially inclose the insulating means, having therein a hollow which is in effect, as shown, a longitudinal trough or groove with a rounded or semi-cylindrical bottom and inwardly extending flanges 11 at its ends. The insulating means 10 shown comprises two parts each of which is rounded to conform to the groove and may, as shown, consist of an ordinary cylindrical porcelain insulator with an exterior circumferential groove near one end. As will be seen from Figs. 3 and 4, the flanges 11 fit or engage in the grooves in the insulators, and thus serve as means for securing the insulators in proper position. At the front of the main portion 5 of the bracket is an internally threaded cylindrical boss portion 15 which contains a passage extending transversely of the main portion and in a plane disposed at an angle to that of the said main portion. This opens into the trough in the portion 5 between the insulators and is adapted to receive one end of the arm 2 and serve for its attachment to the bracket.

In the arrangement shown in Fig. 1, the wires 16 by which current is supplied to the lamp 4 issue from the insulators at opposite sides of the bracket 1 and enter the part 3 through suitable holes therein, the connection to these wires from the main current supply wires (which may extend vertically between the rear of the bracket and the surface of the part to which it is attached) being between the insulators. Of course, various arrangements of the wiring may be made, and in series lighting systems, in particular, it may be convenient to have the main wires of the circuit enter and leave through the insulators and to have the wires to the lamp extend through the hollow arm 2.

It will be observed that the bracket member can be made as a simple iron casting without any finishing except such as is involved in the threading of the hole that receives the bracket arm, and that it is simple, strong, and durable and presents a good appearance. Also it is very easy for even unskilled persons to secure it in the position and to insert the porcelain insulators and the wiring and screw in the arm.

What I claim as new and desire to secure by Letters Patent of the United States, is:—

1. An integral bracket for an electric fixture comprising a main portion having a longitudinal passage therethrough and a transversely extending passage communicating with said longitudinal passage and lying in a plane disposed at an angle to that of the said main portion, and feet extending laterally from said main portion for mounting the said bracket.

2. A bracket for an electric fixture comprising a substantially horizontally extending main portion having a longitudinal trough in the back thereof and a transversely extending substantially horizontally disposed passage communicating with said longitudinal passage and lying in a plane disposed at an angle to said main portion, and attaching means conforming to the shape of the body to which the bracket is to be attached extending from said main portion.

3. A bracket for an electric fixture comprising a main portion having a trough-like hollow open at the side which lies toward the object to which the bracket is secured, there being inwardly extending flanges at the ends of said hollow, feet for mounting the bracket extending laterally from said main portion, and porcelain insulators arranged in said hollow having grooves in which said flanges are engaged so as to secure the insulators against displacement, and means for the attachment of a transversely extending arm to said main portion.

In witness whereof, I have hereunto set my hand.

WILFRID LUMLEY.

Witnesses:
CHARLES E. DRUST,
R. E. CLEVELAND.